US011102624B2

(12) United States Patent
Rapp et al.

(10) Patent No.: US 11,102,624 B2
(45) Date of Patent: Aug. 24, 2021

(54) AUTOMATED MESSAGING

(71) Applicant: Amazon Technologies, Inc., Reno, NV (US)

(72) Inventors: Ryan Christopher Rapp, Seattle, WA (US); Douglas Vincent O'Dell, Montclair, NJ (US); Kathryn Lynn Parker, Sammamish, WA (US); Jonathan Leonard Da Silva, Seattle, WA (US); Ian Michael Menzies, San Francisco, CA (US); Christo Frank Devaraj, Seattle, WA (US); David Michael Rowell, Snoquaimie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/997,639

(22) Filed: Jun. 4, 2018

(65) Prior Publication Data
US 2018/0310144 A1 Oct. 25, 2018

Related U.S. Application Data

(63) Continuation of application No. 14/983,356, filed on Dec. 29, 2015, now Pat. No. 9,992,642.

(51) Int. Cl.
*H04M 3/42* (2006.01)
*H04M 1/72436* (2021.01)
(Continued)

(52) U.S. Cl.
CPC ............ *H04W 4/14* (2013.01); *H04M 1/271* (2013.01); *H04W 68/005* (2013.01); *H04M 1/72436* (2021.01); *H04M 3/42204* (2013.01)

(58) Field of Classification Search
CPC ....... H04W 68/005; H04W 4/14; H04W 8/08; H04M 1/72552; H04M 1/271; H04M 3/42204; H04M 1/72436
See application file for complete search history.

(56) References Cited

U.S. PATENT DOCUMENTS 6,507,735 B1 1/2003 Baker
8,238,952 B1* 8/2012 Kakarla ................ H04M 7/003
455/466
(Continued)

OTHER PUBLICATIONS

Non-final Office Action filed in U.S. Appl. No. 14/983,356 dated Dec. 29, 2015.
(Continued)

*Primary Examiner* — Marcos L Torres
(74) *Attorney, Agent, or Firm* — Hogan Lovells US LLP

(57) ABSTRACT

Approaches provide for generating an introductory text message to be delivered to a recipient when a voice-enabled communications device is used to send a message to the recipient for a first time. For example, audio input data that includes an instruction to send a text message can be received and an application can analyze the audio input data to determine an instruction to send a text message, a message body, and an intended recipient of the text message. The application can determine whether a text message has previously been sent to the intended recipient using the voice-enabled communications device or another device associated with the customer's account. In the situation where a text message has been sent, a text message is generated that includes the message body and the application causes the text message to be sent to the intended recipient. In the situation where it is determined that this is the first time a text message is being sent to the intended recipient using the voice-enabled communications device or another device associated with the customer's account, an
(Continued)

introductory text message is generated and the application causes the introductory text message and the text message that includes the message body to be sent to the intended recipient.

20 Claims, 8 Drawing Sheets

(51) Int. Cl.
    *H04W 4/14*          (2009.01)
    *H04M 1/27*          (2006.01)
    *H04W 68/00*        (2009.01)

(56) References Cited

U.S. PATENT DOCUMENTS

| | | | |
|---|---|---|---|
| 9,094,811 | B1 | 7/2015 | Rosen |
| 2004/0240642 | A1* | 12/2004 | Crandell ................ H04L 51/12 379/88.22 |
| 2004/0254990 | A1* | 12/2004 | Mittal .................... H04L 51/12 709/206 |
| 2008/0178073 | A1* | 7/2008 | Gao ........................ G06F 17/24 715/243 |
| 2011/0054899 | A1* | 3/2011 | Phillips .................. G10L 15/30 704/235 |
| 2013/0097269 | A1* | 4/2013 | Plotkin .................. H04L 51/02 709/206 |

OTHER PUBLICATIONS

Non-final Office Action filed in U.S. Appl. No. 14/983,356 dated Aug. 23, 2017.
Final Office Action filed in U.S. Appl. No. 14/983,356 dated Apr. 6, 2017.
Notice of Allowance filed in U.S. Appl. No. 14/983,356 dated Feb. 13, 2018.

\* cited by examiner

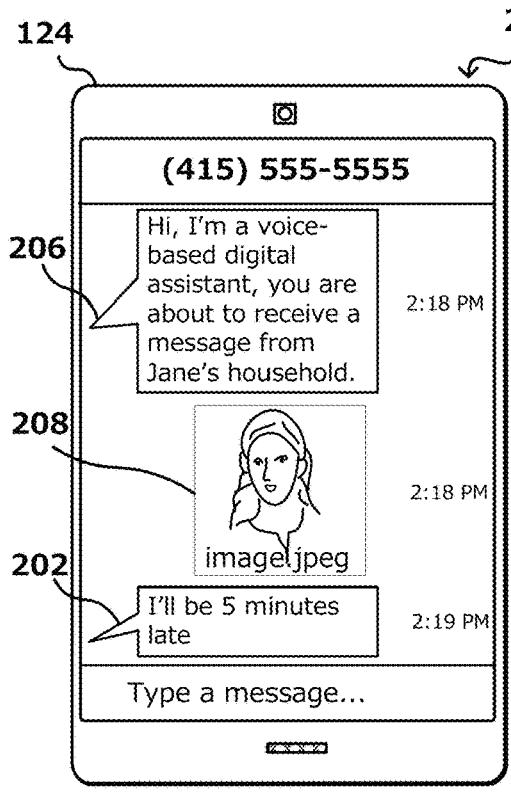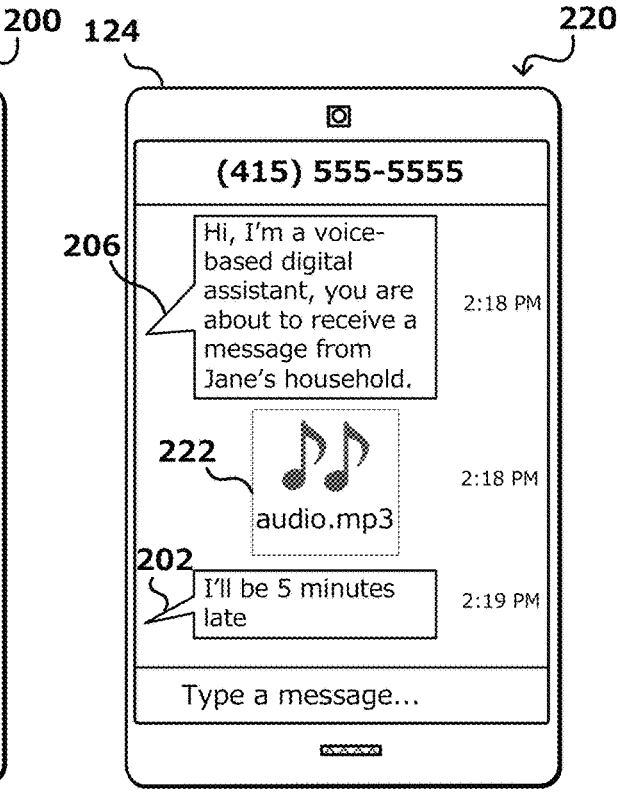
FIG. 2A    FIG. 2B
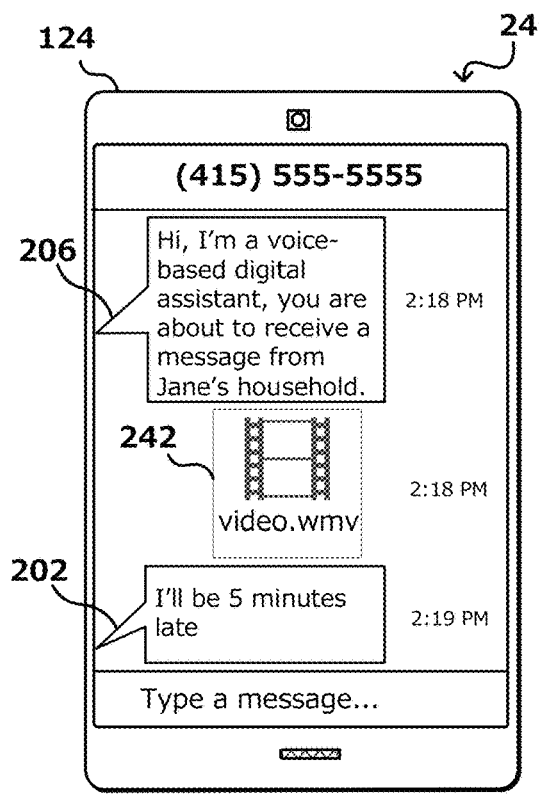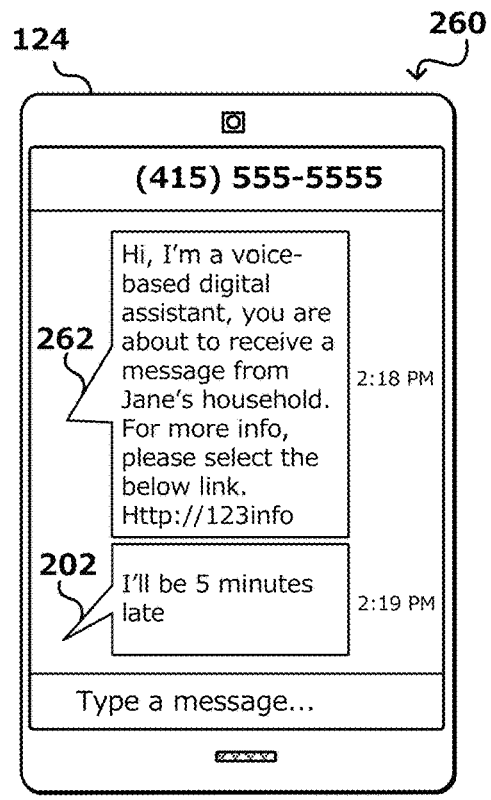
FIG. 2C    FIG. 2D

AUTOMATED MESSAGING

CROSS-REFERENCE TO RELATED APPLICATIONS

This is a continuation application of U.S. patent application Ser. No. 14/983,356, filed on Dec. 29, 2015, entitled "AUTOMATED MESSAGING," which is hereby incorporated herein by reference in its entirety.

BACKGROUND

As electronic devices become increasingly sophisticated, people are using such devices in new and interesting ways. For example, some devices have adopted voice control where the device can perform various actions in response to a spoken question or instruction. In response to the question or instruction, these devices can provide information, music, audiobooks, news, weather, traffic, sports, control connected devices, etc.

BRIEF DESCRIPTION OF THE DRAWINGS

Various embodiments in accordance with the present disclosure will be described with reference to the drawings, in which:

FIGS. 2A, 2B, 2C, and 2D illustrate example introductory text messages received by an intended recipient in accordance with various embodiments;

DETAILED DESCRIPTION

Figure 1A:
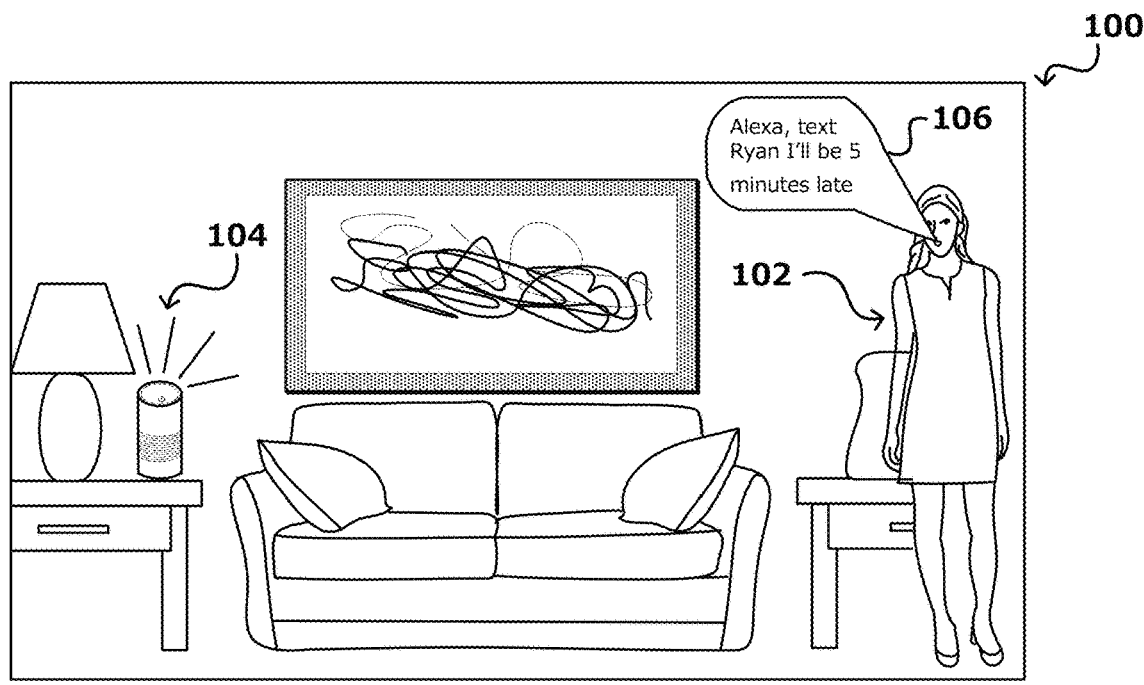
FIGS. 1A and 1B illustrate an example environment in which aspects of the various embodiments can be utilized.

Systems and methods in accordance with various embodiments of the present disclosure may overcome one or more of the aforementioned and other deficiencies experienced in conventional approaches to sending electronic communications between electronic devices. In particular, various approaches provide for generating an introductory message (e.g., a text message or a voice message) to be delivered to a recipient when a voice-enabled communications device is used to send a message to the recipient for the first time.

For example, when a voice-enabled communications device is used to send an electronic message (e.g., text message or voice message) and/or initiate a telephone call, a telephone number can be automatically assigned to the voice-enabled communications device. As described further herein, a voice-enabled communications device can perform various actions in response to a spoken question or instruction. In one such example, the voice-enabled communications device can receive an instruction to send an electronic message. The audio input data that includes the instruction can be received by the voice-enabled communications device and an application executing on the voice-enabled communications device or otherwise in communication with the voice-enabled communications device can analyze the audio input data to determine how to carry out the instruction. As will be described herein (e.g., see FIG. 11), the application can execute on a backend server in communication with the voice-enabled communications device to determine how to carry out the instruction.

In this example, the audio input data includes an instruction to send a text message, a message body, and an intended recipient of the text message. The application determines whether a text message has previously been sent to the intended recipient using the voice-enabled communications device. In the situation where a text message has been sent, a text message is generated that includes the message body and the text message is sent to the intended recipient. In the situation where it is determined that this is the first time a text message is being sent to the intended recipient using the voice-enabled communications device, an introductory text message (or text messages) is generated. The introductory text message can include, for example, one or more text messages or other information (e.g., images, video, audio, etc.) that indicates to the intended recipient an identity of the sending entity. The information can include, for example, a uniform resource locator (URL) that references a webpage that describes text messaging features of the voice-enabled communications device, an image of the person sending the text message or other authorized user of the voice-enabled communications device, an audio file of the person sending the text message speaking the instruction to the voice-enabled communications device to send the text message, as well as any other information that may be useful to indicate to the intended recipient an identity of the sending entity. The introductory text message and the text message that includes the message body can be sent to the intended recipient. Thereafter, the intended recipient can respond or otherwise interact with the text message as permitted by their messaging application.

Various other functions and advantages are described and suggested below in accordance with the various embodiments.

FIG. 1A illustrates an example environment 100 wherein a user 102 is interacting with a voice-enabled communications device 104. A voice-enable communications device includes, for example, any device having a microphone or other component configured to generate audio data from sound in the frequency range in which humans communicate. As will be described further herein, voice-enabled communications devices include devices that utilize a wakeword or other predetermined sound profile to activate some functionality (e.g., send data to a remote device, such as audio input data for speech analysis) as well as button-activated devices that utilize a button (graphical, physical, or both) to enable some audio-related functionality (e.g., a sound-capturing and sending mode). In this example, user 102 can speak a request within an environment where the voice-enabled communications device 104 is located. The request may be any question, inquiry, instruction, phrase, or other set of one or more words/sounds. For example, the user may say, "Alexa, text Ryan I'll be 5 minutes late." In this example, the word "Alexa" has a special connotation, in that it may be referred to as a wakeword, or activation word (the wakeword would be a different word, or a particular phoneme or a particular sound, such as the sound made by clapping or snapping your fingers). In particular, a wakeword may be detected within audio input data detected by one or more microphones located on the voice-enabled communications device. Persons of ordinary skill in the art will recognize, however, that the one or more microphones may alternatively be located on a separate device in communication with the voice-enabled communications device. In some embodiments, after the wakeword is detected, the voice-enabled communications device may begin interpreting/analyzing audio input data until no more speech is detected.

In general, the voice-enabled communications device 104 constantly listens for the wakeword and is otherwise inactive. Once the wakeword is recognized, the voice-enabled communications device switches from a passive mode to an active mode. It should be noted that the wakeword does not have to be the first word or sound in a given sentence or request. The voice-enabled communications device can be configured such that it can record and store a limited amount of audio input data that should, in most instances, is the amount of time needed to speak a sentence or more. Accordingly, even if a wakeword is recognized in the middle or end of a sentence, the voice-enabled communications device will have retained the entire sentence which can then be analyzed by backend servers to determine what is being requested.

An application executing on the voice-enabled communications device or otherwise in communication with the voice-enabled communications device, can analyze the user's speech that includes audio input data 106 to perform at least one function. The functions can include, for example, sending an electronic message (e.g., a text message or a voice message) initiating a phone call, answering questions, playing music, reading audiobooks, controlling connected devices via voice commands/instructions, among other such functions. In this example, the user 102 is attempting to send a text message to a friend, family member, or some other person, such as intended recipient 122 operating a computing device 124. A text message can be a message that, when delivered on a display screen of the computing device, is displayed in visual characters. It should be noted that the other types of messages can be sent as well, which may include voice messages, video messages, for example.

The voice-enabled communications device can be associated with a customer account provided by a service provider. The customer account can include one or more profiles, e.g., one or more family member profiles or other profiles, where each profile can be associated with a telephone number, preferences, access rights, and other information, and may share certain account settings as may include payment information (same credit card), address, message allotment, etc. In the situation where one of the members desires to send a text message, the member can activate the voice-enabled communications device, for example, using a wakeword, announce who they are, and then speak the text message. Announcing who they are can cause the device to load the appropriate member profile and corresponding preferences, access rights, and contacts authority. In various embodiments, rather than have a member announce who they are, the voice-enabled communications device can automatically determine the member speaking using speech analysis software. For example, an application executing on the voice-enabled communications device or otherwise in communication with the device can analyze the speaker's voice to determine an identity of the speaker and associated profile. Based on the identity of the speaker, the appropriate member profile and corresponding preferences, access rights, and contracts authority can be used. It should be noted that other approaches can be implemented to login to a particular profile. For example, each profile may be logged into by, for example, saying the wakeword then a special keyword/phrase (e.g., sign in as Jane) and/or by biometrics (i.e., speaker identification based on sound of voice and, if camera is available, facial recognition or, if fingerprint scanner, fingerprint ID), among other such approaches.

In this example, the customer account can be associated with a user profile associated with user 102, where the user has associated a contacts authority with their user account. The contacts authority can include contact information about people they communicate with. Each contact can be associated with information like names, email addresses, phone numbers, physical addresses, employer, department, job title, among other types of information. The service provider can provide an internet-based voice service as well as other services. The voice service can receive and can analyze audio input data using speech recognition software and/or other audio analysis software to determine an action to perform based on the received audio input data. In this example, the user 102 is attempting to send a text message to intended recipient 122. To initiate sending of the text message, the user 102 has spoken an instruction to send a text message to the intended recipient 122.

For example, in response to the user 102 speaking the phrase "Alexa, text Ryan I'll be 5 minutes late," audio input data 106 that includes the phrase is received at the voice-enabled communications device 104 and an application executing on the voice-enabled communications device or otherwise in communication with the voice-enabled communications device can analyze the audio input data 106. For example, the contents of the audio input data are essentially streamed to a backend server (see FIG. 11 for further explanation) such that at least a portion of the audio input data can be received by the backend server and analysis can begin on that portion and any subsequent portions immediately upon receipt. In particular, the backend server can begin processing one or more portions of the audio input data prior to the user having completed making the instructions. Thus, the backend server can start analyzing whatever portion of the audio input data it received through a variety of techniques such as automatic speech recognition (ASR) and natural language understanding (NLU) to convert the audio input data into a series of identifiable words, and then to analyze those words in order to interpret the meaning of the request from the user. The backend server can utilize ASR techniques to recognize the spoken words that were recorded and stored in the MP3 data and to translate them into known text that can then be analyzed by NLU techniques to attempt to decipher the meaning of the request from user. Any suitable computer implemented speech-to-text technique may be used to convert the received audio signal(s) into text, such as SOFTSOUND speech processing technologies available from the Autonomy Corporation, which is headquartered in Cambridge, England, United Kingdom. In some embodiments, one or more filters may be applied to the received audio input data to reduce or minimize extraneous noise, however this is not required. In this example, analyzing the audio input data 106 can include determining a message body "I'll be 5 minutes late," an intended recipient "Ryan," and an instruction "Text," to send the text message to the intended recipient. The backend server can then cause a text message to be sent to the mobile number associated with Ryan.

As described, the voice-enabled communications device can be associated with a contacts authority. In the situation where Ryan is associated with a mobile number, the text message will be sent to the mobile number. In the situation where Ryan is not associated with a mobile number, the voice-enabled communications device can prompt the sending entity for Ryan's mobile number. Additionally or alternatively, the sending entity can update the contacts authority using a computing device, for example, by logging into a contacts application and updating the contact information associated with Ryan. It should be noted that although a person is illustrated as initiating the sending of the text message, any sending entity (i.e., any person, electronic device, internet-based service, etc.) can initiate the sending of the text message. Further, as would be understood to one skilled in the art, the audio input data can be analyzed for any one of a number of different functions, wherein sending a text message is just one of those functions.

Figure 1B:
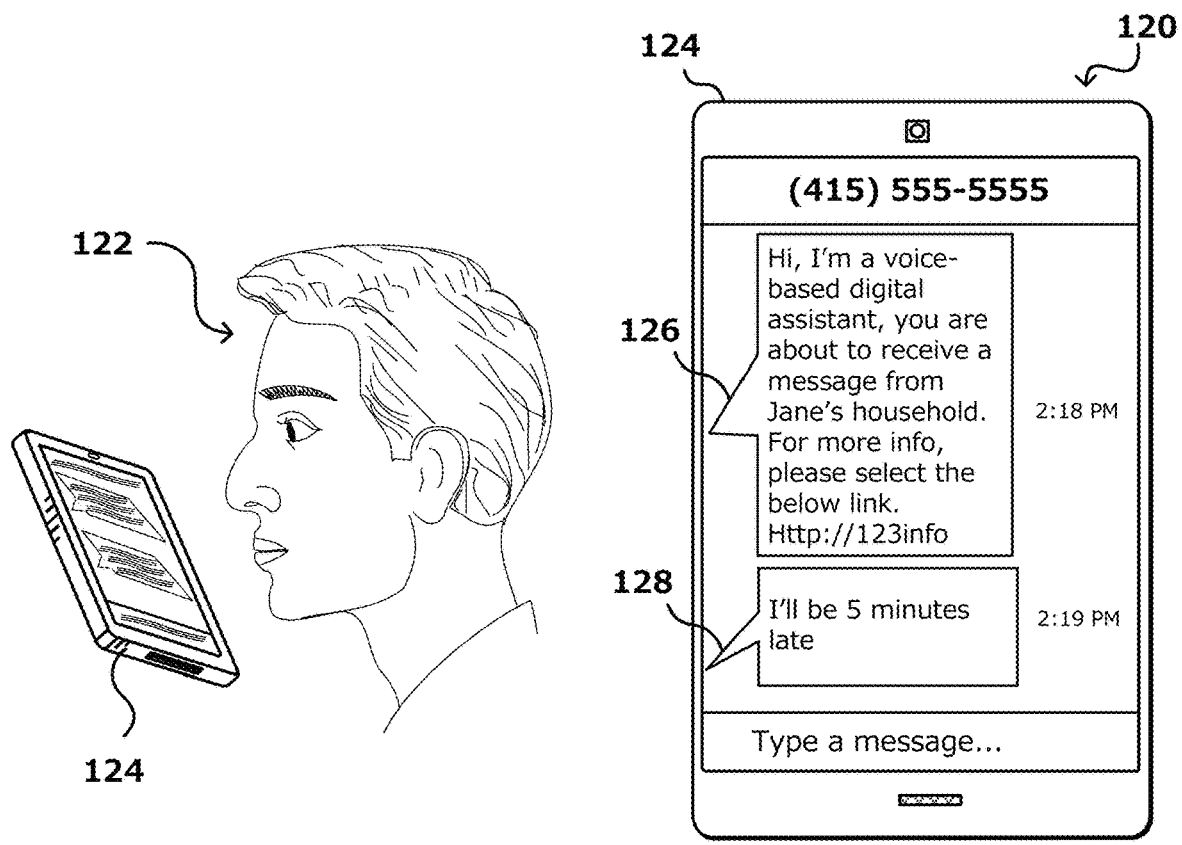

As shown in example 120 of FIG. 1B, the intended recipient 122 Ryan can receive the text message 128 on computing device 124 and can view the text message 128 using a messaging app executing on the computing device 124. Although a portable computing device (e.g., a smart phone, an electronic book reader, or tablet computer) is shown, it should be understood that various other types of electronic device that are capable of receiving electronic messages can be used in accordance with various embodiments discussed herein. These devices can include, for example, notebook computers, ultrabooks, tablet computers, mobile phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others.

Once the instruction to send a text message is received, the application determines whether a text message has previously been sent to the intended recipient using the voice-enabled communications device. In the situation where a text message has been sent, a text message that includes the message body is generated and the text message is sent to the intended recipient. Generating the text message can include, for example, analyzing the audio input data to identify the message body and converting the message body using speech-recognition software or other similar software to an alphanumeric string. The alphanumeric string is used to generate the text message by including the alphanumeric string in the text message.

In the situation where it is determined that a text message has not been sent to the intended recipient using the voice-enabled communications device, an introductory text message 126 is generated and sent with the text message. Determining that a text message has not been sent to the intended recipient includes, for example, comparing the mobile number of the intended recipient to a log that includes telephone numbers that have had sent a text message using the voice-enabled communications device to determine if there is a match to one of the numbers. If there is a match, then a text message has been sent and the introductory text message is not generated. If there is no match, then the introductory text message is generated.

Because the intended recipient may not recognize the telephone number used to send the text message, the intended recipient may discard or otherwise not respond to the text message, which may be undesirable given that the text message was sent to inform the intended recipient that user was running late. Advantageously, the introductory text message 126 "introduces" the telephone number by providing information that explains that the telephone number is associated with the user 102. In this way, the introductory text message indicates to the intended recipient an identity of the sending entity and the intended recipient is likely to respond to the text message or at least accept that the text message is being sent from a legitimate source. Examples of information that indicate an identity of the sending entity are illustrated in FIGS. 2A-2D.

As shown in example 200 of FIG. 2A, computing device 124 has displayed thereon an introductory text message 206 that indicates to the intended recipient an identity of the sending entity, a text message 202 from a sending entity (e.g., user 102 of FIG. 1A) to an intended recipient (e.g., intended recipient 122 of FIG. 1B), and an image 208 that "introduces" an identity of the sending entity. In this example, the image includes a representation of the sending entity. The image can be an image selected from, for example, the sending entity's profile. As described, the voice-enabled communications device is associated with a customer account provided by a service provider. The customer account can include a profile. The profile can include bio information about the sending entity. The bio information can include a profile image of the sending entity, an introductory video of the sending entity, as well as basic information like the sending entity's name, email addresses, phone numbers, physical address, employer, department, job title, among other types of information. It should be noted that other images, video, and information as known in the art can be associated with the sending entity's profile. This can include, for example, online photo albums, links to social media and other websites, etc.

As shown in example 220 of FIG. 2B, the computing device 124 has displayed thereon the introductory text message 206, the text message 202, and an audio file 222 that indicates to the intended recipient an identity of the sending entity. In accordance with an embodiment, the audio file can be sent as a downloadable file, where the intended recipient can download the audio file to their computing device and play the audio file using an appropriate application. In various embodiments, a link can be provided that, when selected, can cause the audio file to be streamed to the intended recipient's computing device. In this situation, the audio file is not downloaded; rather, the audio input data is provided to the intended recipient's computing device as a continuous stream of data. The audio file can include, for example, the sending entity speaking the instruction to send the text message. In this example, the audio file would include the sending entity speaking "I'll be 5 minutes late." Because the intended recipient will likely recognize the sending entity's voice, the intended recipient will likely trust the authenticity of the text message and respond to the text message. Additionally or alternatively, the audio file can have the effect of minimizing the back-and-forth of text messages between the sending entity and the intended recipient to ascertain the owner of the telephone number used to send a text message to the intended recipient.

As shown in example 240 of FIG. 2C, the computing device 124 has displayed thereon the introductory text message 206, the text message 202, and a video file 242 that indicates to the intended recipient an identity of the sending entity. As described with respect to the audio file, the video file can be sent as a downloadable file, where the intended recipient can download the video file to their computing device and can play the video file using an appropriate device. In various embodiments, a link can be provided that, when selected, can cause the video file to be streamed to the intended recipient's computing device. The video file can include, for example, a representation of the sending entity, video associated with the sending entity, or any other video. For example, the video can include the sending recipient discussing features of their voice-enabled communications device and how the voice-enabled communications device is being used to send text messages. Because the intended recipient will likely recognize the sending entity in the video file, the intended recipient will likely trust the authenticity of the text message and respond to the text message. Additionally or alternatively, the video file can have the effect of minimizing the back-and-forth of text messages between the sending entity and the intended recipient to ascertain the owner of the telephone number used to send a text message to the intended recipient.

As shown in example 260 of FIG. 2D, the computing device 124 has displayed thereon the introductory text message 262, the text message 202, and a uniform resource locator (URL) 262 that references a webpage that describes the text messaging features of the voice-enabled communications device 104. The webpage can include information such as images, videos, and other content that describes the voice-enabled communications device as well as the features of the voice-enabled communications device. Because the intended recipient will have a better understanding of the situation around the text message, the intended recipient will likely trust the authenticity of the text message and respond to the text message, or at least minimize the back-and-forth of text messages between the sending entity and the intended recipient to ascertain the owner of the telephone number used to send a text message to the intended recipient.

In accordance with various embodiments, the information provided to the intended recipient (e.g., the image, the audio file, the video file, etc.) can be based on relationship information that specifies a relationship between the sending entity and the intended recipient. The relationship information can indicate, for example, a family relationship, or a preferential relationship, such as one indicated by a contact on one of a favorite list, an acquaintance list, a degree of friendship (e.g., first, second, etc.) list, among other types of lists. For example, in the situation where the sending entity's contacts authority includes relationship information indicating that the intended recipient is the brother of the sending entity, the additional information can include a personalized image or video of the sending entity. The personalized image and/or video can be different from, for example, a default image and/or image that might be displayed on the profile page of the sending entity. In accordance with various embodiments, the sending entity can adjust the type of media that is provided by, for example, adjusting one of sharing settings, privacy settings, or other settings in the profile settings of their profile page.

In accordance with various embodiments, the customer account can include one or more profiles, where each profile can be associated with preferences, access rights, and other information. For example, each profile can be associated with a contacts authority. In the situation of where multiple users are using the same voice-enabled communications device, e.g., a family with multiple family members, each family member can be associated with a profile and that profile can be associated with a contacts authority, preferences, and access rights. In the situation where one of the family members desires to send a text message, the family member can activate the voice-enabled communications device using a wakeword (e.g., a phrase that causes the voice-enabled communications device to listen for requests and/or commands), announce who they are, and speak the text message. Announcing who they are can cause the device to load the appropriate family member profile and corresponding preferences, access rights, and contacts authority. In various embodiments, rather than have a family member announce who they are, the voice-enabled communications device can automatically determine the family member speaking using speech analysis software. In this example, an application executing on the voice-enabled communications device or otherwise in communication with the device can analyze the speaker's voice to determine an identity of the speaker and associated profile. Based on the identity of the speaker, the appropriate member profile and corresponding preferences, access rights, and contracts authority can be used. As will be apparent to a person of reasonable skill in the art, the one or more profiles are not limited to family members but can include different groupings of people having any type of relationship. Example groupings include work groupings, school groupings, etc.

In certain embodiments, other types of messages can be sent as well, as may include voice messages, multimedia messages, etc. A voice message can be a message sent to a destination using voice media. Example multimedia messages can include a combination of text, audio, still images, animation, video, or other interactive content forms. Multimedia Messaging Service (MMS) is one way to send messages that include multimedia content to and from computing devices over a cellular network. In one example, in response to the user speaking the phrase "Alexa, send the voice message Ryan I'll be 5 minutes late," audio input data that includes the phrase can received at the voice-enabled communications device. An application executing on the voice-enabled communications device or otherwise in communication with the voice-enabled communications device can analyze the audio input data to identify relevant portions of the audio input data. In this example, analyzing the audio input data can include determining a message body "I'll be 5 minutes late," an intended recipient "Ryan," and an instruction "Voice message," to send the voice message to the intended recipient. The voice message will be sent to the mobile number associated with Ryan. As described, because the intended recipient may not recognize the telephone number used to send the voice message, an introductory electronic message can be provided. The introductory electronic message can include one of a text message, a voice message, or a combination thereof. For example, in the situation where the user sends a text message, a text introductory message can be sent. In the situation where the user sends a voice message, a voice introductory message can be sent. In various embodiments, the introductory message does not have to mirror the electronic message sent to an intended recipient; rather, one of the text introductory message or the voice introductory message can be sent.

In various embodiments, a user may use the voice-enabled communications device to send a group electronic message to one or more intended recipients individually or as a group. For example, sending the group electronic message to one or more intended recipients individually can include sending an electronic message individually to each intended recipient. In this situation, each intended recipient may have an individual conversation thread with the sending entity. A group message can also include sending an electronic message to one or more intended recipients. Sending the group electronic message as a group message differs from individually sending an electronic message to the one or more intended recipients in that in sending the message as a group message the intended recipients share a conversation thread. In this example, messages sent by the sending entity and intended recipients can be viewed by all members in the group message.

As described, because the intended recipients may not recognize the telephone number used to send the electronic message, an introductory electronic message can be provided. In the situation where the electronic message is sent individually to one or more intended recipients, an introductory message can be sent in accordance with embodiments described herein. For example, first it can be determined whether an electronic message has previously been sent to the intended recipients using the voice-enabled communications device. In the situation where an electronic message has been sent to all intended recipients, an electronic message can be generated that includes the message body and the electronic message can be sent to the intended recipients. In the situation where it is determined that this is the first time an electronic message is being sent to at least one of the intended recipients using the voice-enabled communications device, an introductory electronic message can be generated for the intended recipient(s) that is receiving the electronic message for the first time.

In the situation where the electronic message is sent as a group message to a group of intended recipients, there are a number of approaches that can be implemented. In a first approach, in the situation where it is determined that this is a first time an electronic message is being sent to at least one member included in the group message, an introductory message can be sent to the group conversation. In this situation, the introductory message can generally include information to indicate to the intended recipients a name of a user associated with the customer account of the voice-enabled communications device. In the situation where a threshold number of members have received the introductory message, the introductory message can be modified to explain, for example, that although some members have received an introductory message others have not. The introductory message can proceed to indicate to the intended recipients a name of a user associated with the customer account of the voice-enabled communications device. In another approach, an introductory electronic message can be sent individually to each group member that is receiving an electronic message from the telephone number associated with the voice-enabled communications device for a first time. In this situation, the group conversation thread does not receive the introductory electronic message; rather, the introductory electronic message is sent individually to group members that are receiving an electronic message for a first time from the telephone number associated with the voice-enabled communications device. In this situation, the introductory electronic message can be tailored to each person in accordance with the approaches described herein.

Figure 3A:
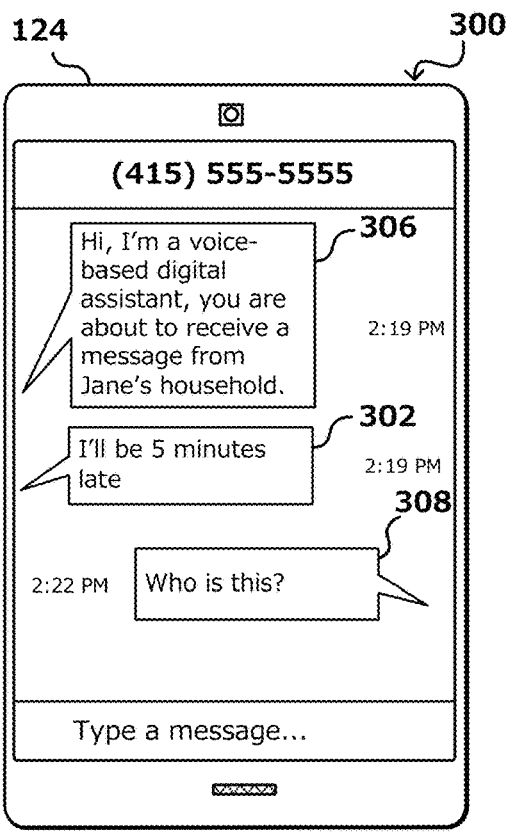
FIGS. 3A, 3B, and 3C illustrate an example approach to automated text messaging in accordance with various embodiments.
Figure 3B:
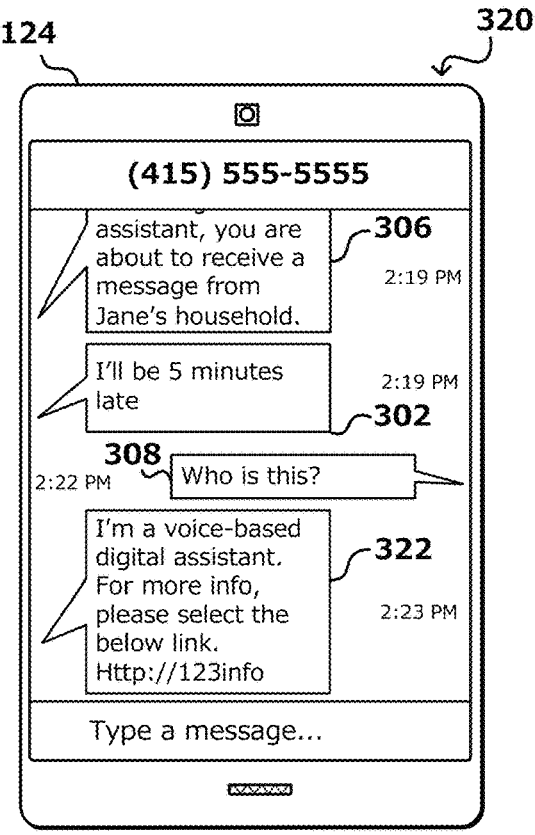
Figure 3C:
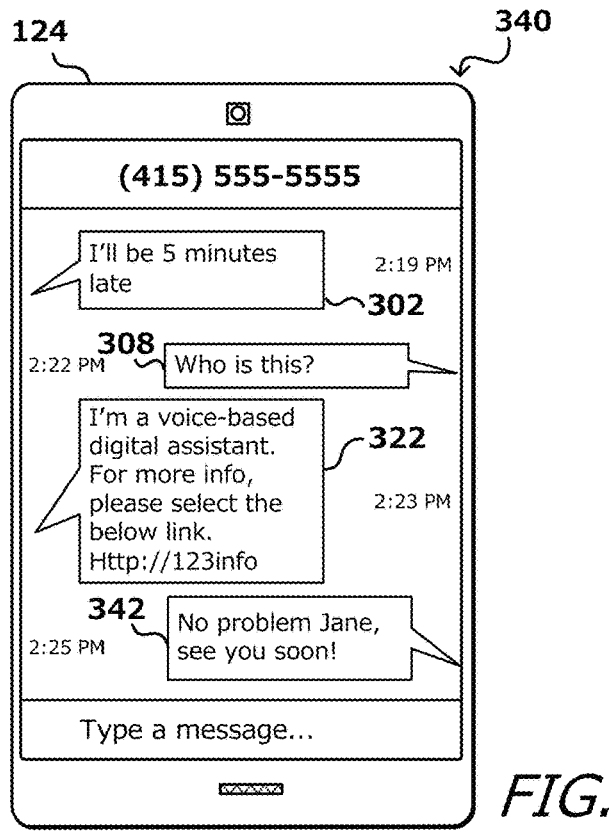

FIGS. 3A, 3B, and 3C illustrate an example approach to automated messaging in accordance with various embodiments. As described, the introductory text message indicates to the intended recipient an identity of the sending entity. Advantageously, the intended recipient will likely respond to the text message given that they know the sending entity. In some situations, however, instead of responding to the text message, the intended recipient may respond asking "who is this?" Accordingly, in accordance with various embodiments, approaches allow for the automatic response to certain text messages received by the sending entity.

For example, as shown in example 300 of FIG. 3A, computing device 124 operated by the intended recipient has displayed thereon an introductory text message 306, a text message 302, and a response to the text message 308. In this situation, instead of responding to the text message "I'll be 5 minutes late," the intended recipient asks "Who is this?" An application executing on the voice-enabled communications device, or otherwise remote the voice-enabled communications device, can determine that the response to the text message 308 is one of a number of predetermined text messages and respond to the text message as shown in example 320 of FIG. 3B. As shown, the application has caused to be sent a text message 322 that explains that the text messages are sent from a customer account associated with a voice-enabled communications device. A URL can be provided that provides a reference to a webpage that includes additional information about the voice-enabled communications device. In this example, the intended recipient can respond by sending a text message 342 to the sending entity, as shown in example 340 of FIG. 3C. In should be noted that the intended recipient can also send a text message that is not necessarily in response to a received text message. As shown in FIG. 3C, the intended recipient responds acknowledging that the sending entity will be late by stating "No problem Jane, see you soon!"

In accordance with various embodiments, in response to receiving the text message, the voice-enabled communications device can generate an alert indicating that a text message has been received. The alert can include at least one of a visual alert or an audible alert. An example of a visual alert includes the display of lights. The lights can be displayed in a number of different ways. For example, the lights can be displayed in a particular pattern, color arrangement, etc. The audible alert can include voice alerts, electronic sound effects, music and/or songs among others types of audible alerts.

In accordance with various embodiments, in additional to an alert being generated by the voice-enabled communications device (or instead of), an alert can be generated by a computing device associated with the sending entity. The computing device can have executing thereon an application that generates an alert when a text message is sent to the telephone number associated with the voice-enabled communications device. The application can be, for example, software that pairs or otherwise interacts with the voice-enabled communications device, and can be used to cause the computing device to generate an alert when a text message is sent to the telephone number associated with the voice-enabled communications device. The alert can be any alert type supported by the computing device. Example alert types include at least one of visual alerts and audible alerts, such as popup messages, electronic sound effects, voice alerts, music and/or songs, etc. In accordance with various embodiments, the application can be used to respond to text messages as well as generate new text messages.

The alerts can be customized based on the profile used to send the text messages. For example, alerts for a first profile may include alerts to be sent to a designated computing device, which may not include alerts to the voice-enabled communications device. Alerts for a second profile may include alerts to both the voice-enabled communications device and alerts to a computing device running software configured to operate with the voice-enabled communications device. Other customizations of the alerts can include whether the alerts are only visual, only audible, or a combination thereof. In accordance with an embodiment, a do not disturb feature can be enable where alerts that arrive at either (or a selected one of) the voice-enabled communications device or the computing device will be silenced (i.e., no visual or audible alert). The do not disturb feature can be always on or on for a scheduled period of time. In accordance with an embodiment, the profile can have set preferences to allow alerts from only certain members of a user's contacts authority, where alerts caused by other users sending a text message to the telephone number associated with the voice-enabled communications device are silenced.

Figure 4:
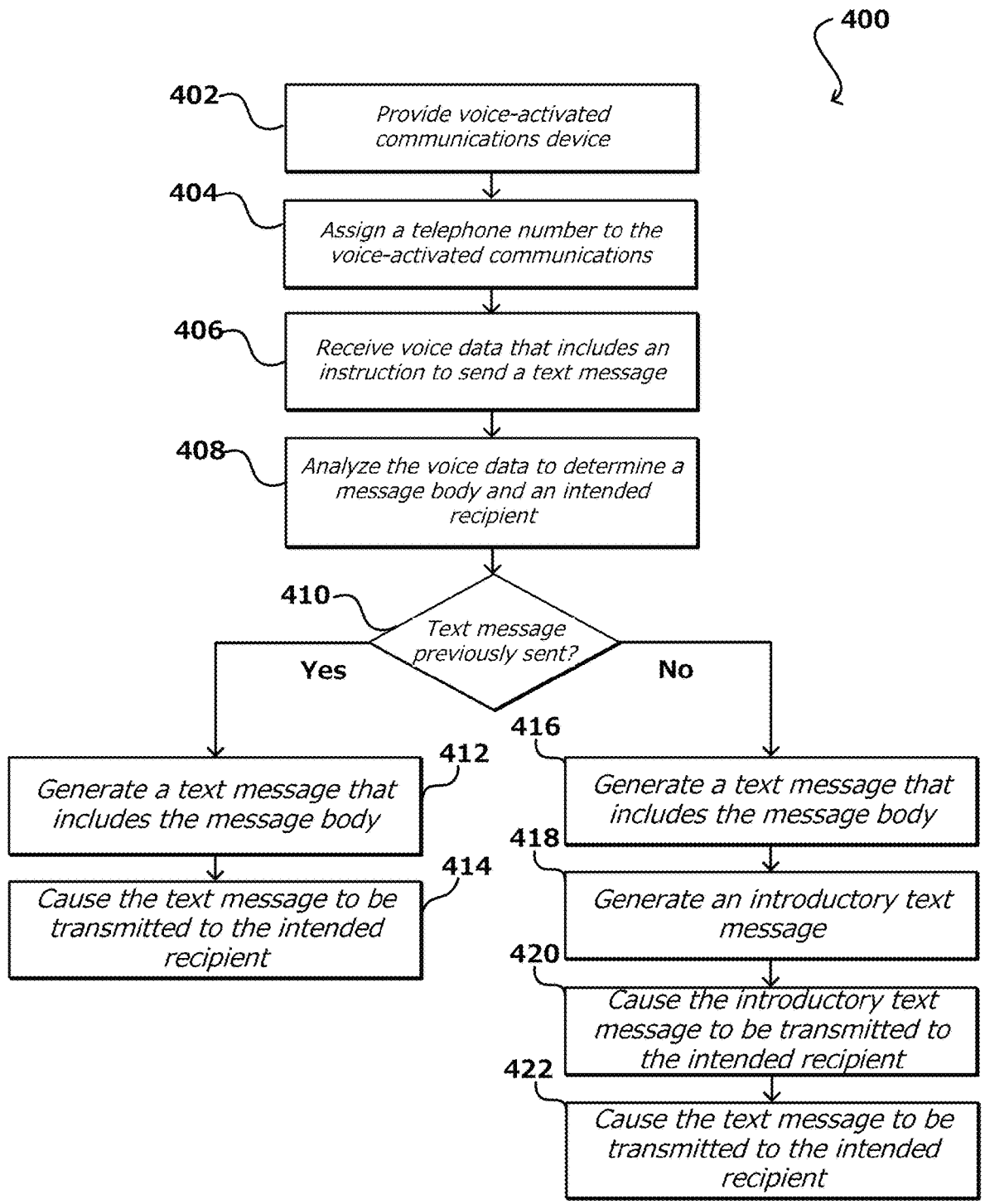
FIG. 4 illustrates an example process for generating an introductory text message in accordance with various embodiments.

FIG. 4 illustrates an example process for generating an introductory text message in accordance with various embodiments. It should be understood that, for any process discussed herein, there can be additional, fewer, or alternative steps performed in similar or alternative orders, or in parallel, within the scope of the various embodiments unless otherwise stated. In this example, a voice-enabled communications device is provided 402. The voice-enabled communications device can include one or more microphones that can capture voice or other audio input data, wherein an application executing on the voice-enabled communications device or otherwise in communication with the voice-enabled communications device can analyze the data to perform a function. The functions can include, for example, sending a text message, initiating a phone call, answering questions, playing music, reading audiobooks, controlling connected devices via voice commands, among other functions. In this example, a sending entity (e.g., someone speaking to the voice-enabled communications device) is attempting to send a text message to a person, such as a friend, a family member, or some other intended recipient.

A telephone number is assigned 404 to the voice-enabled communications device. The telephone number can be assigned to a customer account that is associated with the voice-enabled communications device, where the customer account can be provided by a service provider. The service provider can provide an internet-based voice service as well as other services. The voice service can receive and can analyze audio input data using speech recognition software and/or other audio analysis software to determine an action to perform based on the receive audio input data. The telephone number can be assigned in response to an attempt to send a text message, initiate a telephone call, when the customer account was created, or any time after the customer account was created. Text messages sent using the voice-enabled communications device will be associated with the telephone number. In some instances a user may want to modify or deactivate use of the telephone number. Accordingly, in accordance with various embodiments, a request can be sent to the service provider requesting to modify the telephone number, select a different telephone number, or deactivate the telephone number.

To initiate the sending of the text message, the sending entity speaks an instruction to send a text message to an intended recipient. The voice-enabled communications device receives 406 audio input data that includes the instruction and the audio input data is analyzed 408 by an application executing on the voice-enabled communications device (or otherwise provided to and received by an application in communication with the voice-enabled communications device) to determine an instruction to send a text message, a message body, and an intended recipient of the text message. For example, in the situation where the sending entity speaks the instruction "Text Ryan I'll be 5 minutes late" the application analyzes the audio input data to determine a message body "I'll be 5 minutes late," an intended recipient "Ryan," and an instruction "Text," to send a text message to the intended recipient. The text message will be sent to the mobile number associated with Ryan. In accordance with an embodiment, the voice-enabled communications device can be associated with a contacts authority. In the situation where Ryan is associated with a mobile number, the mobile number will be used. In the situation where Ryan is not associated with a mobile number, the voice-enabled communications device can prompt the user for the mobile number.

The application determines 410 whether a text message has previously been sent to the intended recipient using the voice-enabled communications device. Determining that a text message or other electronic communication to be sent to the intended recipient is a first electronic communication includes, for example, comparing the mobile number of the intended recipient to a log that includes telephone numbers that have had sent a text message using the voice-enabled communications device to determine if there is a match to one of the numbers (if any). In the situation where a text message has been sent, a text message is generated 412 that includes the message body and the service provider can cause 414 the text message to be sent to the intended recipient. In the situation where it is determined this is the first time a text message is being sent to the intended recipient using the voice-enabled communications device, a text message that includes the message body is generated 416 and an introductory text message is generated 418.

The introductory text message (or introductory text messages) can include one or more text messages or other information (e.g., images, video, audio, etc.) that indicates to the intended recipient an identity of the sending entity. The information can include at least one of a uniform resource locator (URL) that references a webpage that describes at least the text messaging features of the voice-enabled communications device, an image of an authorized user of the voice-enabled communications device, an audio file of the authorized user speaking the instruction to the voice-enabled communications device, as well as any other information. The service provider can cause 420 the introductory text message to be sent to the intended recipient and can cause 422 the text message that includes the message body to be sent to the intended recipient. Causing the introductory text message and the text message to be sent to the intended recipient can include, for example, sending the messages over any appropriate network, including a telephone network, a cellular network, a wireless network, or any other such network or combination thereof. In accordance with various embodiments, these networks can include communication modes such as data transfer/text messaging. Text messaging takes the known form of the short messaging service (SMS), which allows point-to-point service by sending "short" messages to and from wireless handsets. Thereafter, the intended recipient can respond or otherwise interact with the text message as they would any other text message.

In accordance with various embodiments, the introductory text message includes information to indicate to the intended recipient an identity of the sending entity. Because of this, the intended recipient will likely respond to the text message. In some situations, however, instead of responding to the text message the intended recipient may respond asking "who is this?" Accordingly, in accordance with various embodiments, approaches allow for the automatic response to certain text messages received by the sending entity.

Figure 5:
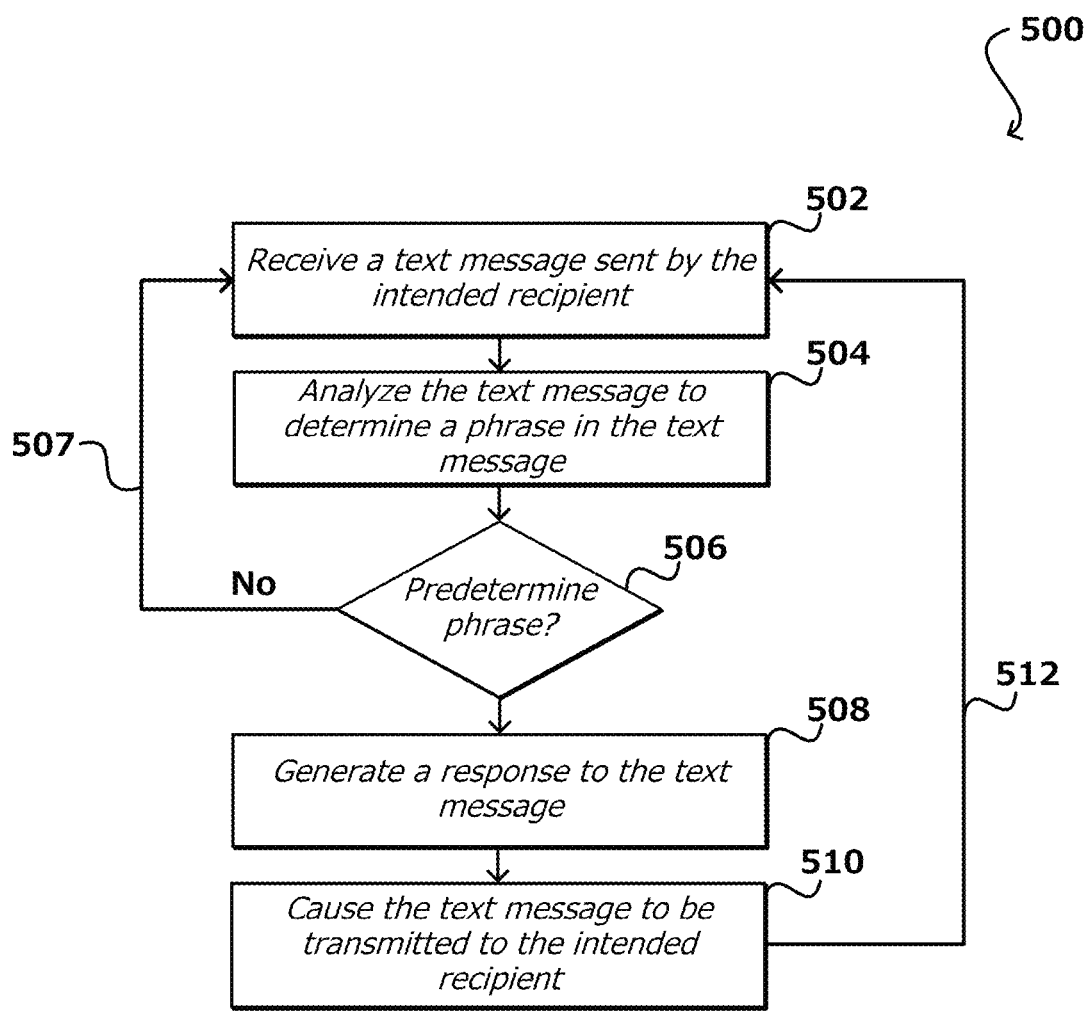
FIG. 5 illustrates an example process for automatically generating a text message in accordance with various embodiments.

For example, FIG. 5 illustrates an example process 500 for automatically generating messages in accordance with various embodiments. In this example, the intended recipient has responded to the sending entity's text message with the phrase "Who's this?" An application executing on the voice-enabled communications device or remote to the voice-enabled communications device can receive 502 a text message sent by the intended recipient and analyzes 504 the text message to determine a text segment or phrase in the text message. The phrase can be one or more words. Analyzing the text message to determine the phrase can include analyzing the text message using text recognition software to identify one or more words in the text message. The one or more words can be compared to known or predetermined phrases to identity phrases in the text message. The phrases are compared to known phrases to determine 506 whether the phrase is one of a number of predetermined phrases. In the situation where the phrase doesn't match one of the predetermined phrases, the voice-enabled communications device can wait 507 to process other text messages (if any). In the situation where the phrase does match one of the predetermined phrases, a response to the text message can be generated 508. For example, each phrase can be associated with a response. Generating the text message can include creating a message that includes the response associated with the matched phrase. Thereafter, the service provider can cause 510 the text message to be sent to the intended recipient. In accordance with various embodiments, the automatic sending of text messages can continue 512 for a predetermined period of time, a predetermined number of sent text messages, indefinitely, or a combination thereof. In various situations, the phrase may match more than one predetermined phrases. In some situations, words can be added and/or removed from any of the phrases. In various embodiments, the phrase that is ultimately used and/or the modification to the phrases can be based on relationship information that specifies a relationship between the sending entity and the intended recipient. As described, the relationship information can indicate, for example, a family relationship, or a preferential relationship, such as one indicated by a contact on one of a favorite list, an acquaintance list, a degree of friendship (e.g., first, second, etc.) list, among other types of lists. For example, in the situation where the sending entity's contacts authority includes relationship information indicating that the intended recipient is the brother of the sending entity, the reply phrase can include terms indicating a family relationship. Additionally or alternatively, additional information can be provided with the text message, as may include an image or video of the sending entity. The sending entity can adjust the type of media that is provided to a recipient under privacy settings in the profile settings of the profile for the sending entity.

Figure 6:
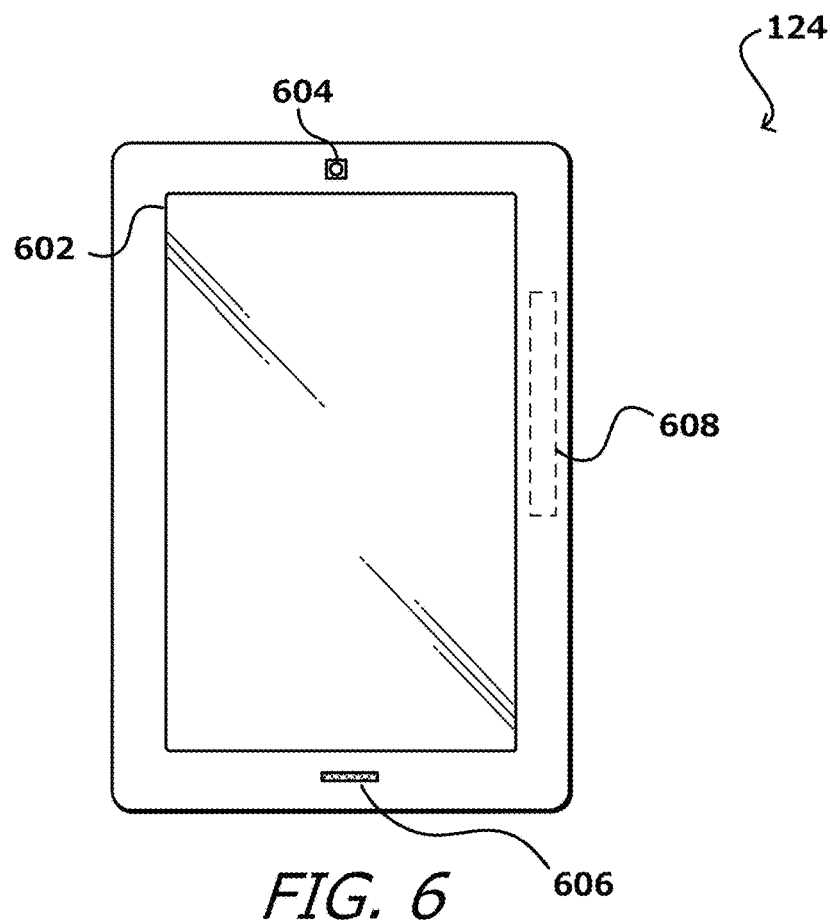
FIG. 6 illustrates an example of a computing device that can be used in accordance with various embodiments.

FIG. 6 illustrates an example computing device 124 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. These devices can include, for example, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others.

In this example, the computing device 124 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include an imaging element 604 on the front of the device. It should be understood, however, that image capture elements could also, or alternatively, be placed on the sides or corners of the device, and that there can be any appropriate number of capture elements of similar or different types. The imaging element 604 may be, for example, a camera, a charge-coupled device (CCD), a motion detection sensor or an infrared sensor, or other image capturing technology.

The computing device can also include at least one microphone or other audio capture elements capable of capturing audio input data, such as words spoken by a user of the device, music being hummed by a person near the device, or audio being generated by a nearby speaker or other such component, although audio elements are not required in at least some devices. In this example there microphone 606 is on the front side of the device. In some devices there may be only one microphone, while in other devices there might be at least one microphone on each side and/or corner of the device, or in other appropriate locations.

The computing device 124 in this example also includes one or more orientation- or position-determining elements operable to provide information such as a position, direction, motion, or orientation of the device. These elements can include, for example, accelerometers, inertial sensors, electronic gyroscopes, and electronic compasses.

The example device also includes at least one communication mechanism 608, such as may include at least one wired or wireless component operable to communicate with one or more electronic devices. The device also includes a power system, such as may include a battery operable to be recharged through conventional plug-in approaches, or through other approaches such as capacitive charging through proximity with a power mat or other such device. Various other elements and/or combinations are possible as well within the scope of various embodiments.

Figure 7:
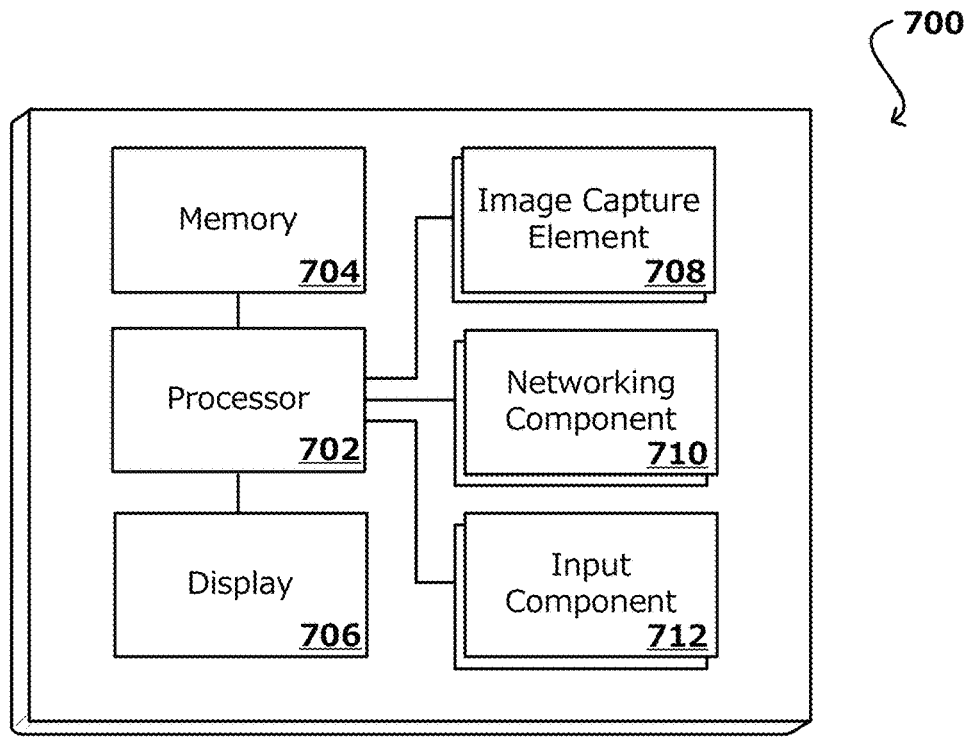
FIG. 7 illustrates an example configuration of components of a computing device such as that illustrated in FIG. 6.

FIG. 7 illustrates a set of basic components of an electronic computing device 700 such as the computing device 124 described with respect to FIG. 6. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The computing device 124 typically will include some type of display screen 706, such as a touch screen, electronic ink (e-ink), organic light emitting diode (OLED) or liquid crystal display (LCD), although devices such as portable media players might convey information via other means, such as through audio speakers.

As discussed, the computing device 124 in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device.

Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command/instruction from a user, application, or other device.

The example computing device 124 also includes at least one orientation determining element able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the computing device 124. An orientation determining element can also include an electronic or digital compass, which can indicate a direction (e.g., north or south) in which the device is determined to be pointing (e.g., with respect to a primary axis or other such aspect).

As discussed, the computing device 124 in many embodiments will include at least a positioning element for determining a location of the device (or the user of the device). A positioning element can include or comprise a GPS or similar location-determining elements operable to determine relative coordinates for a position of the computing device 124. Positioning elements may include wireless access points, base stations, etc., that may either broadcast location information or enable triangulation of signals to determine the location of the device. Other positioning elements may include QR codes, barcodes, RFID tags, NFC tags, etc., that enable the computing device 124 to detect and receive location information or identifiers that enable the computing device 124 to obtain the location information (e.g., by mapping the identifiers to a corresponding location). Various embodiments can include one or more such elements in any appropriate combination.

The example computing device 124 also includes one or more networking components 710 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The computing device 124 also includes a power system, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the computing device 124 can include at least one additional input device 712 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 8:
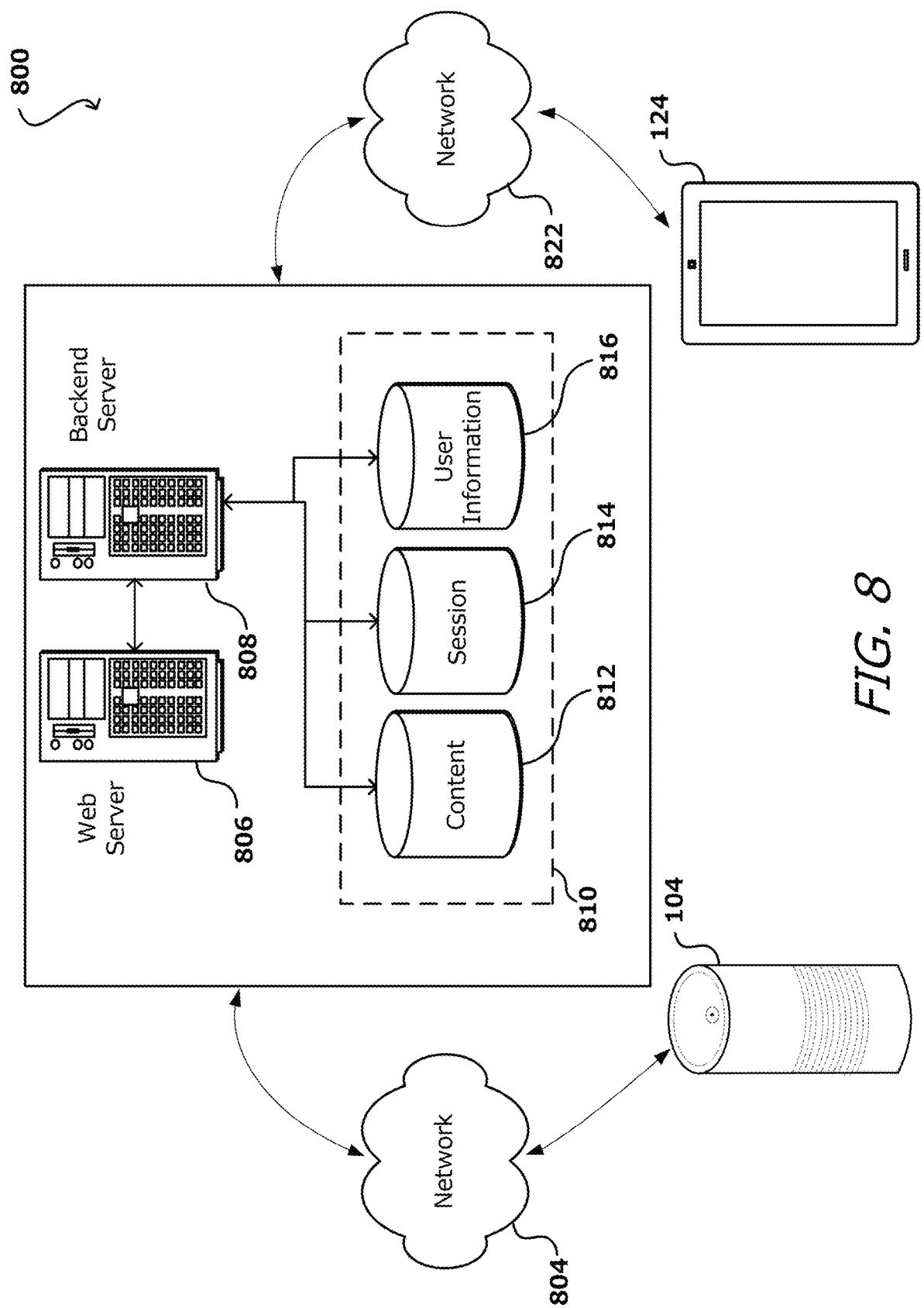
FIG. 8 illustrates an example environment in which various embodiments can be implemented.

In accordance with various embodiments, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes voice-enabled communications device 104 computing device 124, which can include any appropriate device operable to send and receive requests, messages or information over networks 804 and 822 and convey information back to an appropriate device. These devices can include, for example, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others. The networks can include any appropriate network, including a telephone network provided by a telecommunication operator, an intranet, the Internet, a cellular network, a local area network, wireless network, or any other such network or combination thereof. The network could be a telephone network, a "push" network, a "pull" network, or a combination thereof. Wireless networks often include communication modes such as data transfer/text messaging. Text messaging takes the known form of the short messaging service (SMS), which allows point-to-point service by sending "short" messages to and from wireless handsets. The service uses a short message service center (SMSC) to store and forward short messages. The wireless network transports messages between the SMSCs and the subscriber units. With this service, an active subscriber unit, such as a mobile handset, can receive or transmit a short message at any time, independent of whether or not a voice or data call is in progress. The system guarantees delivery of the message with failures being identified and the message stored in the network until the destination is available. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one backend server 808 and a data store 810. It should be understood that there can be several backend servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The backend server 808 can include any appropriate hardware and software for integrating with the data store 810 as needed to execute aspects of one or more applications for the client device and handling a majority of the data access and business logic for an application. The application server provides access control services in cooperation with the data store and is able to analyze audio date and other data as well as generate content such as text, graphics, audio and/or video to be transferred to the user, which may be served to the user by the Web server 806 in the form of HTML, XML or another appropriate structured language in this example. The handling of all requests and responses, as well as the delivery of content between the voice-enabled communications device 104 and computing device 124 and the backend server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be other information that may need to be stored in the data store, such as page image information and access rights information, which can be stored in any of the above listed mechanisms as appropriate or in additional mechanisms in the data store 810. The data store 810 is operable, through logic associated therewith, to receive instructions from the backend server 808 and obtain, update or otherwise process data in response thereto. In one example, a user can send a text message using a voice-enabled communications device. In this case, the data store might access the user information to verify the identity of the user and can access a contacts authority to determine a telephone number of an intended recipient. The user's speech can be analyzed and used to generate a text message to a person associated with the telephone number.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

Figure 9:
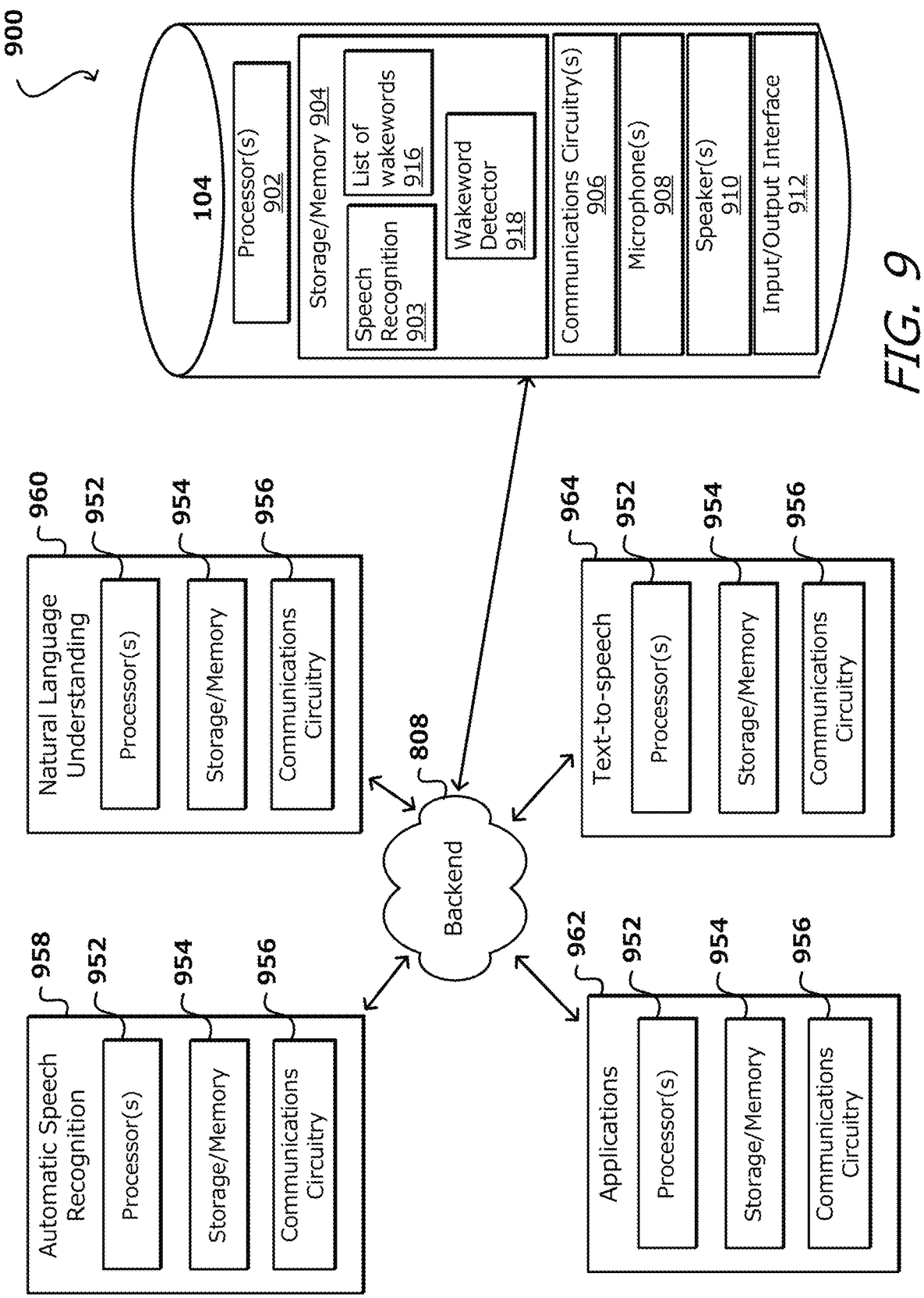
FIG. 9 illustrates an example for sending electronic communications between electronic devices.

FIG. 9 is another example environment 900 for implementing aspects in accordance with various embodiments. In this example, voice-enabled comunications device 104, in some embodiments, may correspond to any type of electronic device capable of being activated in response to detecting a specific sound. Voice-enabled comunications device 104 may, in some embodiments, after detecting the specific sound (e.g., a wakeword), recognize commands (e.g., audio commands, inputs) within captured audio, and may perform one or more actions in response to the received commands. Various types of electronic devices may include, but are not limited to, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others. In some embodiments, voice-enabled comunications device 104 may be relatively simple or basic in structure such that no mechanical input option(s) (e.g., keyboard, mouse, trackpad) or touch input(s) (e.g., touchscreen, buttons) may be provided. For example, voice-enabled comunications device 104 may be capable of receiving and outputting audio, and may include power, processing capabilities, storage/memory capabilities, and communication capabilities.

Voice-enabled comunications device 104 may include a minimal number of input mechanisms, such as a power on/off switch, however primary functionality, in one embodiment, of voice-enabled comunications device 104 may solely be through audio input and audio output. For example, voice-enabled comunications device 104 may listen for a wakeword by continually monitoring local audio. In response to the wakeword being detected, voice-enabled comunications device 104 may establish a connection with backend server 808, send audio input data to backend server 808, and await/receive a response from backend server 808. In some embodiments, however, non-voice-enabled devices may also communicate with backend server 808 (e.g., push-to-talk devices).

Voice-enabled comunications device 104 may include one or more processors 902, storage/memory 904, communications circuitry 906, one or more microphones 908 or other audio input devices (e.g., transducers), one or more speakers 910 or other audio output devices, as well as an optional visual input/output ("I/O") interface 912. However, one or more additional components may be included within voice-enabled comunications device 104, and/or one or more components may be omitted. For example, voice-enabled comunications device 104 may include a power supply or a bus connector. As another example, voice-enabled comunications device 104 may not include a visual I/O interface. Furthermore, while multiple instances of one or more components may be included within voice-enabled comunications device 104, for simplicity only one of each component has been shown.

Processor(s) 902 may include any suitable processing circuitry capable of controlling operations and functionality of voice-enabled comunications device 104, as well as facilitating communications between various components within voice-enabled comunications device 104. In some embodiments, processor(s) 902 may include a central processing unit ("CPU"), a graphic processing unit ("GPU"), one or more microprocessors, a digital signal processor, or any other type of processor, or any combination thereof. In some embodiments, the functionality of processor(s) 902 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 902 may include its own local memory, which may store program modules, program data, and/or one or more operating systems. However, processor(s) 902 may run an operating system ("OS") for voice-enabled comunications device 104, and/or one or more firmware applications, media applications, and/or applications resident thereon.

Storage/memory 904 may include one or more types of storage mediums such as any volatile or non-volatile memory, or any removable or non-removable memory implemented in any suitable manner to store data on voice-enabled comunications device 104. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 904 may be implemented as computer-readable storage media ("CRSM"), which may be any available physical media accessible by processor(s) 902 to execute one or more instructions stored within storage/memory 904. In some embodiments, one or more applications (e.g., gaming, music, video, calendars, lists, etc.) may be run by processor(s) 902, and may be stored in memory 904.

In some embodiments, storage/memory 904 may include one or more modules and/or databases, such as speech recognition module 903, list of wakewords database 916, and wakeword detection module 918. Speech recognition module 903 may, for example, include an automatic speech recognition ("ASR") component that recognizes human speech in detected audio. Speech recognition module 903 may also include a natural language understanding ("NLU") component that determines user intent based on the detected audio. Also included within speech recognition module 903 may be a text-to-speech ("TTS") component capable of converting text to speech to be outputted by speaker(s) 910, and/or a speech-to-text ("STT") component capable of converting received audio signals into text to be sent to backend server 808 for processing.

List of wakewords database 916 may be a database stored locally on voice-enabled comunications device 104 that includes a list of a current wakeword for voice-enabled comunications device 104, as well as one or more previously used, or alternative, wakewords for voice-enabled comunications device. In some embodiments, user 102 may set or program a wakeword for voice-enabled comunications device 104. The wakeword may be programmed directly on voice-enabled comunications device 104, or a wakeword or words may be set by the individual via a backend server application (app) that is in communication with backend server 808. For example, a user may use their mobile device having the backend server application running thereon to set the wakeword. The specific wakeword may then be communicated from the mobile device to backend server 808, which in turn may send/notify voice-enabled comunications device 104 of the individual's selection for the wakeword. The selected activation may then be stored in list of wakewods database 916 of storage/memory 904.

Wakeword detection module 918 may include an expression detector that analyzes an audio signal produced by microphone(s) 908 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 908. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 908. The expression detector may then compare that score to a threshold to determine whether the wakeword will be declared as having been spoken.

In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice-enabled comunications device 104 may then begin sending the audio signal to backend server 808 for detecting and responds to subsequent utterances made by user 102.

Communications circuitry 906 may include any circuitry allowing or enabling voice-enabled comunications device 104 to communicate with one or more devices, servers, and/or systems. For example, communications circuitry 906 may facilitate communications between voice-enabled comunications device 104 and backend server 808. Communications circuitry 906 may use any communications protocol, such as any of the previously mentioned exemplary communications protocols. In some embodiments, voice-enabled comunications device 104 may include an antenna to facilitate wireless communications with a network using various wireless technologies (e.g., Wi-Fi, Bluetooth, radiofrequency, etc.). In yet another embodiment, voice-enabled comunications device 104 may include one or more universal serial bus ("USB") ports, one or more Ethernet or broadband ports, and/or any other type of hardwire access port so that communications circuitry 906 allows voice-enabled comunications device 104 to communicate with one or more communications networks.

Voice-enabled comunications device 104 may also include one or more microphones 908 and/or transducers. Microphone(s) 908 may be any suitable component capable of detecting audio signals. For example, microphone(s) 908 may include one or more sensors for generating electrical signals and circuitry capable of processing the generated electrical signals. In some embodiments, microphone(s) 908 may include multiple microphones capable of detecting various frequency levels. As an illustrative example, voice-enabled comunications device 104 may include multiple microphones (e.g., four, seven, ten, etc.) placed at various positions about voice-enabled comunications device 104 to monitor/capture any audio outputted in the environment where voice-enabled comunications device 104 is located. The various microphones 908 may include some microphones optimized for distant sounds, while some microphones may be optimized for sounds occurring within a close range of voice-enabled comunications device 104.

Voice-enabled comunications device 104 may further include one or more speakers 910. Speaker(s) 910 may correspond to any suitable mechanism for outputting audio signals. For example, speaker(s) 910 may include one or more speaker units, transducers, arrays of speakers, and/or arrays of transducers that may be capable of broadcasting audio signals and or audio content to a surrounding area where voice-enabled comunications device 104 may be located. In some embodiments, speaker(s) 910 may include headphones or ear buds, which may be wirelessly wired, or hard-wired, to voice-enabled comunications device 104, that may be capable of broadcasting audio.

In some embodiments, one or more microphones 908 may serve as input devices to receive audio inputs, such as speech. Voice-enabled comunications device 104, may then also include one or more speakers 910 to output audible responses. In this manner, voice-enabled communications device 104 may function solely through speech or audio, without the use or need for any input mechanisms or displays.

In one exemplary embodiment, voice-enabled comunications device 104 includes I/O interface 912. The input portion of I/O interface 912 may correspond to any suitable mechanism for receiving inputs from a user of voice-enabled comunications device 104. For example, a camera, keyboard, mouse, joystick, or external controller may be used as an input mechanism for I/O interface 912. The output portion of I/O interface 912 may correspond to any suitable mechanism for generating outputs from voice-enabled comunications device 104. For example, one or more displays may be used as an output mechanism for I/O interface 912. As another example, one or more lights, light emitting diodes ("LEDs"), or other visual indicator(s) may be used to output signals via I/O interface 912 of voice-enabled comunications device 104. In some embodiments, one or more vibrating mechanisms or other haptic features may be included with I/O interface 912 to provide a haptic response to user 102 from voice-enabled comunications device 104. Persons of ordinary skill in the art will recognize that, in some embodiments, one or more features of I/O interface 912 may be included in a purely voice-enabled version of voice-enabled comunications device 104. For example, one or more LED lights may be included on voice-enabled comunications device 104 such that, when microphone(s) 908 receive audio from user 102, the one or more LED lights become illuminated signifying that audio has been received by voice-enabled comunications device 104. In some embodiments, I/O interface 912 may include a display screen and/or touch screen, which may be any size and/or shape and may be located at any portion of voice-enabled comunications device 104. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

FIG. 9 also includes backend server 808, as mentioned previously, which may be in communication with voice-enabled comunications device 104. Backend server 808 includes various components and modules including, but not limited to, automatic speech recognition ("ASR") module 958 (which may include, for example, speech-to-text ("STT") functionality), natural language understanding ("NLU") module 960, applications module 962, and text-to-speech ("TTS") module 964. In some embodiments, backend server 808 may also include computer readable media, including, but not limited to, flash memory, random access memory ("RAM"), and/or read-only memory ("ROM"). Backend server 808 may also include various modules that store software, hardware, logic, instructions, and/or commands, such as, a speaker identification ("ID") module, a user profile module, or any other module, or any combination thereof. The speech-to-text functionality and text-to-speech functionality may be combined into a single module capable of performing both STT and TTS processing, or separate TTS and STT modules may, alternatively, be used.

ASR module 958 may be configured such that it recognizes human speech in detected audio, such as audio captured by voice-enabled comunications device 104, which is then sent to backend server 808. ASR module 958 may include, in one embodiment, one or more processor(s) 952, storage/memory 954, and communications circuitry 956. Processor(s) 952, storage/memory 954, and communications circuitry 956 may, in some embodiments, be substantially similar to processor(s) 902, storage/memory 904, and communications circuitry 906, which are described in greater detail above, and the aforementioned descriptions of the latter may apply. NLU module 960 may be configured such that it determines user intent based on the detected audio received from voice-enabled comunications device 104. NLU module 960 may include processor(s) 952, storage/memory 954, and communications circuitry 956.

Applications module 962 may, for example, correspond to various action specific applications or servers capable of processing various task specific actions. Applications module 962 may further correspond to first party applications and/or third party applications operable to perform different tasks or actions. For example, based on the context of audio received from voice-enabled comunications device 104, backend server 808 may use a certain application to perform an action, such as sending a text message. Applications module 962 may include processor(s) 952, storage/memory 954, and communications circuitry 956. As an illustrative example, applications module 962 may correspond to an electronic messaging application. The electornic messaging application of the applications module 962 can be associated with a customer account. The customer account can be assigned a telephone number and can include at least one profile stored in, for example, user information 816 in FIG. 8 that can be linked to the electronic messaging application in applications module 962. Audio input data can be received at automatic speech recognition module 958 from voice-enabled communications device 104. The automatic speech reconition module 958 can use automatic speech recognition (ASR) techniques on the audio input data to generate text data of the audio input data. The natural language understanding module 960 can use natural language understanding (NLU) techniques on the text data to determine an intended recipient and generate message body data. The electronic messaging application of the applications module 962 can receive information including the customer account, the intended recipient, and message body data. In the situation where the electronic messaging application determines that an electronic communication to be sent to the intended recipient is a first electronic communication being sent to the intended recipient from the customer account, the electronic messaging application determines a telephone number associated with the intended recipient, generates an introductory text message including information to indicate to the intended recipient a name of a user associated with the customer account, and generates a text message that includes the message body data. Thereafter, the electronic messaging application causes the introductory text message to be sent to a recipient device associated with a recipient account of the intended recipient and causes the text message to be sent to the recipient device. In the situation where the electronic messaging application determines that an electronic message has been sent to the intended recipient from the customer account, the electronic messaging application determines a telephone number associated with the intended recipient, generates a text message that includes the message body data, and causes the text message to be sent to the recipient device.

TTS module 964 may employ various text-to-speech techniques. It should be noted that techniques for taking text and converting it into audio input data that can represent speech are well known in the art and need not be described in further detail herein, any suitable computer implemented techniques may be used. TTS module 964 may also include processor(s) 952, storage/memory 954, and communications circuitry 956.

Persons of ordinary skill in the art will recognize that although each of ASR module 958, NLU module 960, applications module 962, and TTS module 964 include instances of processor(s) 952, storage/memory 954, and communications circuitry 956, those instances of processor(s) 952, storage/memory 954, and communications circuitry 956 within each of ASR module 958, NLU module 960, applications module 962, and STT/TTS module 964 may differ. For example, the structure, function, and style of processor(s) 952 within ASR module 958 may be substantially similar to the structure, function, and style of processor(s) 952 within NLU module 960, however the actual processor(s) 952 need not be the same entity.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available from Oracle, Microsoft, Sybase and IBM.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad, microphone, camera, etc.) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, sending and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
    at least one processor;
    memory including instructions that, when executed by the at least one processor, enable the system to:
        receive audio input data representing an uninterrupted user utterance, the uninterrupted user utterance including a spoken instruction for performing an action and an intended recipient for the action;
        determine that the action is for data transmission;
        determine a user account that has a first identifier and that is enabled for the data transmission;
        determine a second identifier for the user account and for use with the data transmission;
        generate first message body data based at least in part on the audio input data;
        identify the intended recipient account for the intended recipient based at least in part on the audio input data;
        generate a first electronic message that includes the first message body data;
        send the first electronic message including the first message body data to the intended recipient account from the user account using the second identifier; and
        subsequent to sending the first electronic message, send a second electronic message including the first identifier as second message body data, different from the first message body data, for presenting to the intended recipient.

2. The system of claim 1, wherein the instructions, when executed further enable the system to:
    determine a relationship between the user account and the intended recipient account; and
    include in the first message body data one of: an indication of the relationship, an image for the user account, a video file for the user account, or a uniform resource locator (URL) that references the audio input data based at least in part on the relationship.

3. The system of claim 1, wherein the instructions, when executed further enable the system to:
    assign the second identifier to the user account to enable the data transmission using the second identifier and a voice-enabled communications device, the voice-enabled communications device connected to a data network.

4. The system of claim 1, wherein the instructions, when executed further enable the system to:
    identify the intended recipient account as a contact; and
    identify a recipient identifier for the intended recipient account.

5. The system of claim 1, wherein the instructions, when executed further enable the system to:
    identify contacts data that includes one or more contacts;
    use automatic speech recognition (ASR) on the audio input data to generate a text data that represents words from the uninterrupted user utterance;
    use natural language understanding (NLU) on the text data to identify the intended recipient account;
    analyze the contacts data to identify the intended recipient account as one of the one or more contacts; and
    identify a recipient identifier for the intended recipient account.

6. The system of claim 1, wherein the instructions, when executed further enable the system to:
    compare a recipient identifier for the intended recipient account to a log of identifiers, the log of identifiers including identifiers that the user account has caused a text message to be sent to;
    determine that the recipient identifier is unlisted in the log; and
    determine that the electronic communication to be sent to the recipient identifier is the first electronic communication being sent to the recipient identifier; and
    include an introductory message identifying the user account of the device in the electronic message.

7. The system of claim 1, wherein the instructions, when executed further enable the system to:
    generate the first message body data by performing natural language processing on the audio input data.

8. A computer-implemented method, comprising:
    receiving audio input data representing an uninterrupted user utterance, the uninterrupted user utterance including a spoken instruction for performing an action and an intended recipient for the action;
    determining that the action is for data transmission;
    determining a user account that has a first identifier and that is enabled for the data transmission;
    determining a second identifier for the user account and for use with the data transmission;
    generating first message body data based at least in part on the audio input data;
    identifying an intended recipient account for the intended recipient based at least in part on the audio input data;
    generating a first electronic message that includes the first message body data;
    sending the first electronic message including the first message body data to the intended recipient account from the user account using the second identifier; and
    subsequent to sending the first electronic message, sending a second electronic message including the first identifier as second message body data, different from the first message body data, for presenting to the intended recipient.

9. The computer-implemented method of claim 8, further comprising:
   determining a relationship between the user account and the intended recipient account; and
   including in the first message body data one of: an indication of the relationship, an image for the user account, a video file for the user account, or a uniform resource locator (URL) that references the audio input data based at least in part on the relationship.

10. The computer-implemented method of claim 8, further comprising:
   assigning the second identifier to the user account to enable the user account to send and receive the data transmission using the second identifier and a voice-enabled communications device, the voice-enabled communications device connected to a data network.

11. The computer-implemented method of claim 8, further comprising:
   identifying the intended recipient account as a contact; and
   identifying a recipient identifier for the intended recipient account.

12. The computer-implemented method of claim 8, further comprising:
   identifying contacts data that includes one or more contacts;
   using automatic speech recognition (ASR) on the audio input data to generate a text data that represents words from the uninterrupted user utterance;
   using natural language understanding (NLU) on the text data to identify the intended recipient account;
   analyzing the contacts data to identify the intended recipient account as one of the one or more contacts; and
   identifying a recipient identifier for the intended recipient account.

13. The computer-implemented method of claim 8, further comprising:
   comparing a recipient identifier for the intended recipient account to a log of identifiers, the log of identifiers including identifiers that the user account has caused a text message to be sent to;
   determining that the recipient identifier is unlisted in the log; and
   determining that the electronic communication to be sent to the recipient identifier is the first electronic communication being sent to the recipient identifier; and
   including an introductory message identifying the user account of the device in the electronic message.

14. The computer-implemented method of claim 8, further comprising:
   generating the first message body data by performing natural language processing on the audio input data.

15. The computer-implemented method of claim 8, wherein the first message body data comprises at least one of a first uniform resource locator (URL) that references a description of the user account, an image for the user account, a video file for the user account, or a second URL that references the audio input data.

16. The computer-implemented method of claim 8, further comprising:
   receiving a message from the intended recipient account;
   analyzing the message to identify a phrase;
   determine a match to a predetermined phrase, the predetermined phrase for a response; and
   generate an automated response that includes the response.

17. A non-transitory computer readable storage medium storing instructions executable by at least one processor to cause the at least one processor to perform operations comprising:
   receiving audio input data representing an uninterrupted user utterance, the uninterrupted user utterance including a spoken instruction for performing an action and an intended recipient for the action;
   determining that the action is for data transmission;
   determining a user account that has a first identifier and that is enabled for the data transmission;
   determining a second identifier for the user account and for use with the data transmission;
   generating first message body data based at least in part on the audio input data;
   identifying an intended recipient account for the intended recipient based at least in part on the audio input data;
   generating a first electronic message that includes the first message body data;
   sending the first electronic message including the first message body data to the intended recipient account from the user account using the second identifier; and
   subsequent to sending the first electronic message, sending a second electronic message including the first identifier as second message body data, different from the first message body data, for presenting to the intended recipient.

18. The non-transitory computer readable storage medium of claim 17, further comprising instructions executable by the at least one processor to cause the at least one processor to perform further operations comprising:
   determining a relationship between the user account and the intended recipient account; and
   including in the first message body data one of: an indication of the relationship, an image for the user account, a video file for the user account, or a uniform resource locator (URL) that references the audio input data based at least in part on the relationship.

19. The non-transitory computer readable storage medium of claim 17, further comprising instructions executable by the at least one processor to cause the at least one processor to perform further operations comprising:
   assigning the second identifier to the user account to enable the data transmission using the second identifier and a voice-enabled communications device, the voice-enabled communications device connected to a data network.

20. The non-transitory computer readable storage medium of claim 17, further comprising instructions executable by the at least one processor to cause the at least one processor to perform further operations comprising:
   identifying the intended recipient account as a contact; and
   identifying a recipient identifier for the intended recipient account.

* * * * *